United States Patent [19]
Thompson et al.

[11] Patent Number: 5,276,994
[45] Date of Patent: Jan. 11, 1994

[54] HYDRODYNAMIC PLANE FOR DOWNRIGGER FISHING

[76] Inventors: Mark S. Thompson, 475 Sapphire St., Redwood City, Calif. 94062; Dennis E. Glover, 570 Avocet Dr. #8112, Redwood City, Calif. 94065

[21] Appl. No.: 2,933
[22] Filed: Jan. 11, 1993
[51] Int. Cl.⁵ .......................... A01K 95/00
[52] U.S. Cl. ................................ 43/43.13
[58] Field of Search ................ 43/42.12, 42.13

[56] References Cited

U.S. PATENT DOCUMENTS

| | | | |
|---|---|---|---|
| 3,738,047 | 6/1973 | Tozer | 43/43.12 |
| 3,755,955 | 9/1973 | Saia | 43/43.13 |
| 3,816,954 | 6/1974 | Bissonette | 43/43.12 |
| 3,835,573 | 9/1974 | Borchardt | 43/43.13 |
| 3,839,813 | 10/1974 | DeSmidt | 43/43.12 |
| 3,863,382 | 2/1975 | Heili | 43/43.13 |
| 3,874,110 | 4/1975 | Larson | 43/43.12 |
| 3,925,920 | 12/1975 | Walker | 43/43.12 |
| 3,940,872 | 3/1976 | Weber | 43/43.13 |
| 4,065,869 | 1/1978 | Berry | 43/43.12 |
| 4,069,611 | 1/1978 | Dusich et al. | 43/43.12 |
| 4,212,127 | 7/1980 | Danials | 43/43.12 |
| 4,282,672 | 8/1981 | Neary | 43/43.13 |
| 4,513,524 | 4/1985 | Jolliff | 43/43.12 |
| 4,876,820 | 10/1989 | Vann | 43/43.13 |
| 4,922,648 | 5/1990 | Louthan | 43/43.13 |
| 4,942,690 | 7/1990 | Lund | 43/43.12 |

Primary Examiner—Kurt Rowan
Attorney, Agent, or Firm—James J. Leary

[57] ABSTRACT

The invention takes the form of a hydrodynamic plane which carries a fishing line up and down along a weighted downrigger trolling line. The position of the plane is controlled by the fisherman through the fishing line which is releasably clipped to a leader attached to the trailing edge of the plane. Whenever there is a mild amount of tension on the fishing line the plane is held in a down-planing position so that the device will dive and be held against the downrigger weight by the hydrodynamic force. The weight of the plane is balanced so that when the tension on the fishing line is relieved or if the fishing line is released from the friction clip, the plane will automatically pivot to an up-planing position and rise to the surface. Thus, the plane will automatically rise to the surface when a fish strikes the hook, or the fisherman can make the device rise to the surface on command without releasing the fishing line so that he or she can check the bait or the lure and send the device back down again.

10 Claims, 12 Drawing Sheets

HYDRODYNAMIC PLANE FOR DOWNRIGGER FISHING

FIELD OF THE INVENTION

This invention relates to a device which facilitates downrigger fishing. More specifically, it relates to a remotely controllable device which carries a fishing line to a predetermined depth and which returns to the surface automatically or in response to a signal from the user.

BACKGROUND OF THE INVENTION

Downrigger fishing is a technique which is common to both commercial fishermen and sports fishermen. The downrigger technique is used to troll for fish which swim at great depths, sometimes 100 feet or more. In this technique a downrigger, which is a line or cable with a heavy weight attached to it, is suspended from a boat to a predetermined depth. One or more fishing lines with baited hooks or lures are releasably attached to the weight or at different depths along the downrigger line. The heavy weight holds the fishing lines at an appropriate depth for catching the fish.

When a fish takes one of the hooks, the fishing line is released from the downrigger so that the fish can be landed without fighting against the heavy weight of the downrigger. A number of releasable clips have been devised for attaching fishing lines to a downrigger. Examples of these include U.S. Pat. Nos. 3,816,954; 3,874,110; 3,925,920; 4,065,869; 4,069,611; 4,513,524 and 4,942,690. Any one of these prior art devices can be used with the present invention, therefore, the specifications of these patents are hereby incorporated by reference in their entirety.

A number of hydrodynamic planing devices have been suggested for use in downrigger fishing. All of these prior art devices suffer from one or more deficiencies which have limited their popularity for downrigger fishing. U.S. Pat. No. 3,738,047 for a Fish Line Carrier describes a device which uses hydrodynamic force to carry a fishing line downward along a downrigger line. The device has a friction clamp which holds the fishing line so that it will be released when the hook is struck by a fish. This device has no mechanism to carry it back up the downrigger line when the fishing line is released. Consequently, each time a fish is caught, the fisherman must add a new fish line carrier to the downrigger line if he wants to avoid reeling up the downrigger each time. Eventually, several line carriers will be stacked up on the downrigger weight. The added weight and the hydrodynamic force of the stacked carriers will make it more difficult to reel up the downrigger line.

U.S. Pat. No. 3,839,813 for a Down Rigger Diving Plane describes another device which uses hydrodynamic force to carry a fishing line downward along a downrigger line. To avoid the disadvantage of adding multiple line carriers to the downrigger line like the device above, this device is made so that it releases from the downrigger line and stays attached to the fishing line when a fish strikes the hook. The device is then reeled in with the fish, and it can be reattached to the downrigger line when the hook is rebaited and lowered again. This approach has the disadvantage that the hydrodynamic resistance of the device on the fishing line reduces the sport and excitement of "playing" the fish while landing it.

U.S. Pat. No. 4,212,127 for a Power Plane For Transporting Fishing Line describes an improved downrigger fishing device which not only uses hydrodynamic force to carry a fishing line downward along a downrigger line, but when the fishing line is released, the power plane changes attitude so that the hydrodynamic force will carry the device back up the downrigger line. This improvement allows the device to be used multiple times so that many fish can be caught without the need to reel in the downrigger or to add several line carriers. However, even this device has a number of disadvantages that have limited its popularity. The device, as described in the patent, is complicated to use and complicated to manufacture. In addition, the device is not responsive to the user. Once the device has been set up and released, it will continue to plane downward until the fishing line is released. The user cannot retrieve the device except by pulling on the fishing line hard enough to detach it from the device so that it will begin to rise up on its own. This means that anytime the fisherman wants to check the bait, he or she must pull the fishing line free from the power plane, reel it in, then reset the power plane so that it will carry the line back down again.

SUMMARY OF THE INVENTION

In keeping with the foregoing discussion, the objective of the present invention is to provide a device for transporting a fishing line down a weighted line such as a downrigger. It is also an objective of the invention that the device should release the fishing line when the hook is taken by a fish, and that the device should automatically return to the surface when the fishing line is released. It is another important objective of the invention that the device should be controllable by the user so that it can be made to dive or to rise to the surface in response to a command from the user. It is an overall objective of the invention to carry out all of these objectives in a device that is simple and inexpensive to manufacture and uncomplicated to use.

In keeping with these objectives, the present invention takes the form of a hydrodynamic plane which rides up and down along the downrigger line. The plane pivots with respect to the downrigger line so that it has a down-planing position and an up-planing position. The position of the plane is controlled by the fisherman through the fishing line which is releasably clipped to a leader attached to the trailing edge of the plane. The shape of the plane is hydrodynamically stable so that it moves smoothly through the water without fluttering as it is trolled behind a boat.

Whenever there is a mild amount of tension on the fishing line the plane is held in the down-planing position so that the device will dive and be held against the downrigger weight by the hydrodynamic force. The weight of the plane is balanced so that when the tension on the fishing line is relieved or if the fishing line is released from the friction clip, the plane will automatically pivot to the up-planing position and rise to the surface. The device will automatically rise whenever a fish pulls the fishing line from the friction clip, and the device can also be made to rise on command by relieving the tension on the fishing line. Thus, the fisherman can make the device rise to the surface without releasing the fishing line so that he or she can check the bait or the lure and send the device back down again. Other objects and advantages of the invention will be apparent to those skilled in the art upon reading and understand-

DETAILED DESCRIPTION OF THE INVENTION

Figure 1:
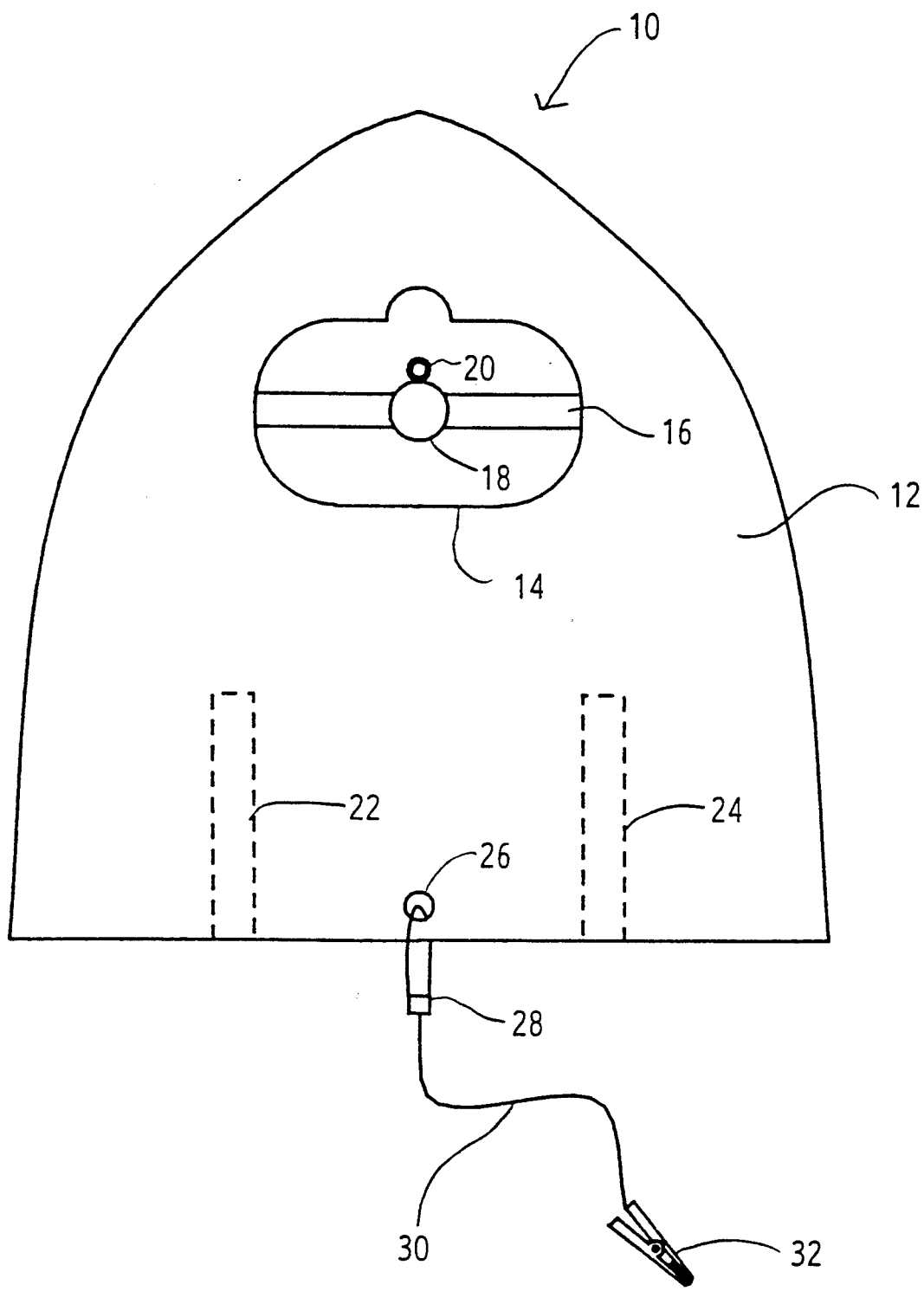
FIG. 1 shows a top view of one embodiment of the hydrodynamic plane.
Figure 2:
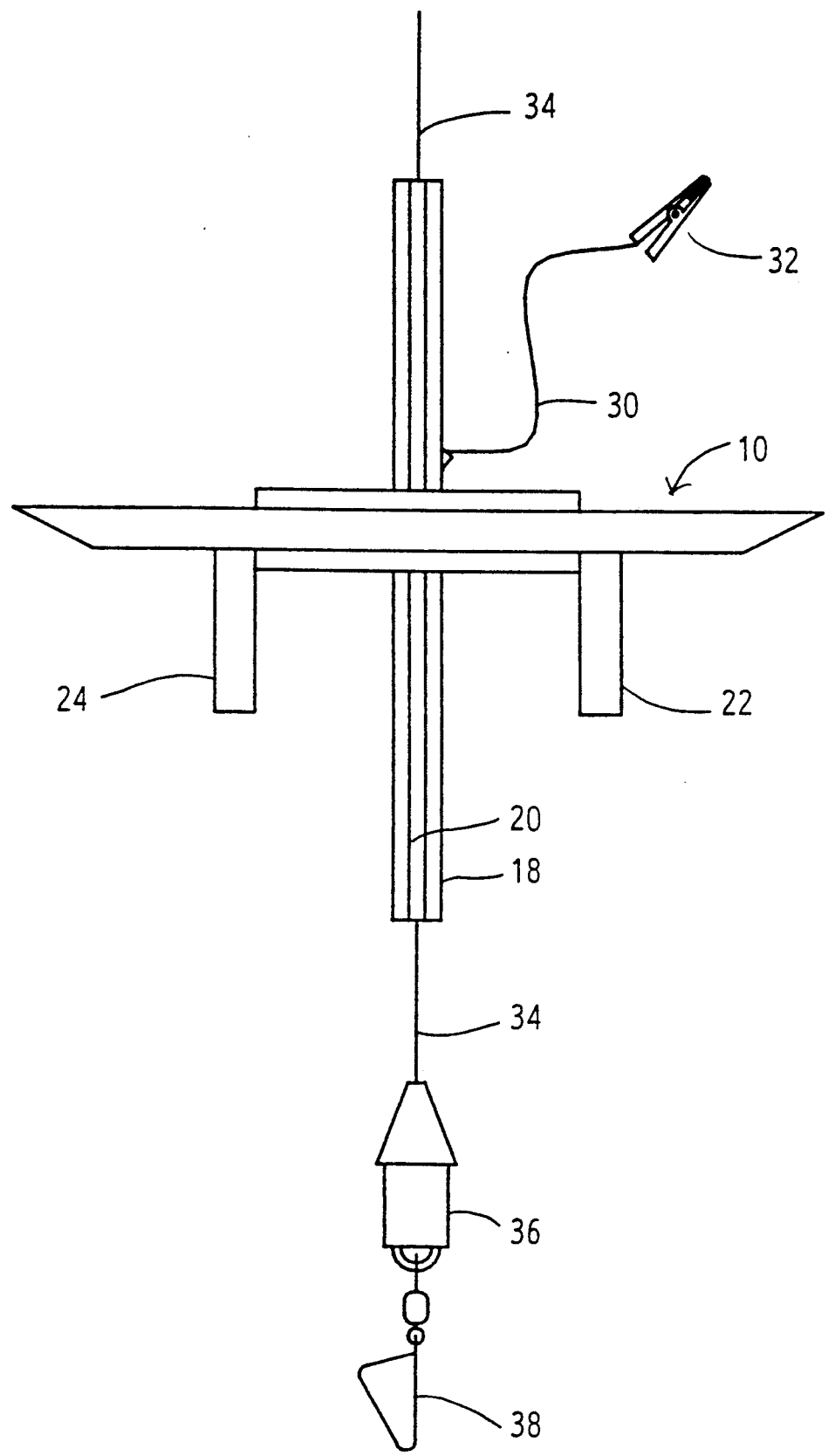
FIG. 2 shows a front view of the hydrodynamic plane.

The first embodiment of the hydrodynamic plane 10 is shown in a top view in FIG. 1 and a front view in FIG. 2. The body 12 of the plane has a streamlined hydrodynamic shape. Two downwardly projecting fins 22, 24 add to the hydrodynamic stability of the plane, and they keep the leading edge of the plane facing into the current as it is trolled through the water. An orifice 14 in the body of the plane contains the pivoting line guide 70. In the preferred embodiment, the line guide is a tube 20 which has a lumen large enough for the downrigger cable 34 to pass through without undue friction. The line guide 70 is pivotally attached to the body 12 of the hydrodynamic plane, for instance by attaching the tube 20 to a vertical rod 18, which in turn is attached to a horizontal rod 16 which is rotatably attached to the periphery of the orifice 14 in the body 12 of the plane, as shown.

A releasable fishing line holder 32 is attached to the hydrodynamic plane by a leader 30 that has a clip 28 which attaches through a small hole 26 near the rear or trailing edge of the body 12 of the plane. The preferred type of releasable fishing line holder 32 is a spring clip similar to an alligator clip which has smooth jaws that are surfaced with a friction material. The clip holds the fishing line with enough force to allow control of the hydrodynamic plane, but will release the line when a force greater than a certain threshold force is applied. Thus, the clip will release the line when a fish takes the hook or when the fisherman deliberately pulls the line free. Other types of commercially available releasable fishing line holders may also be used with the invention.

Figure 3:
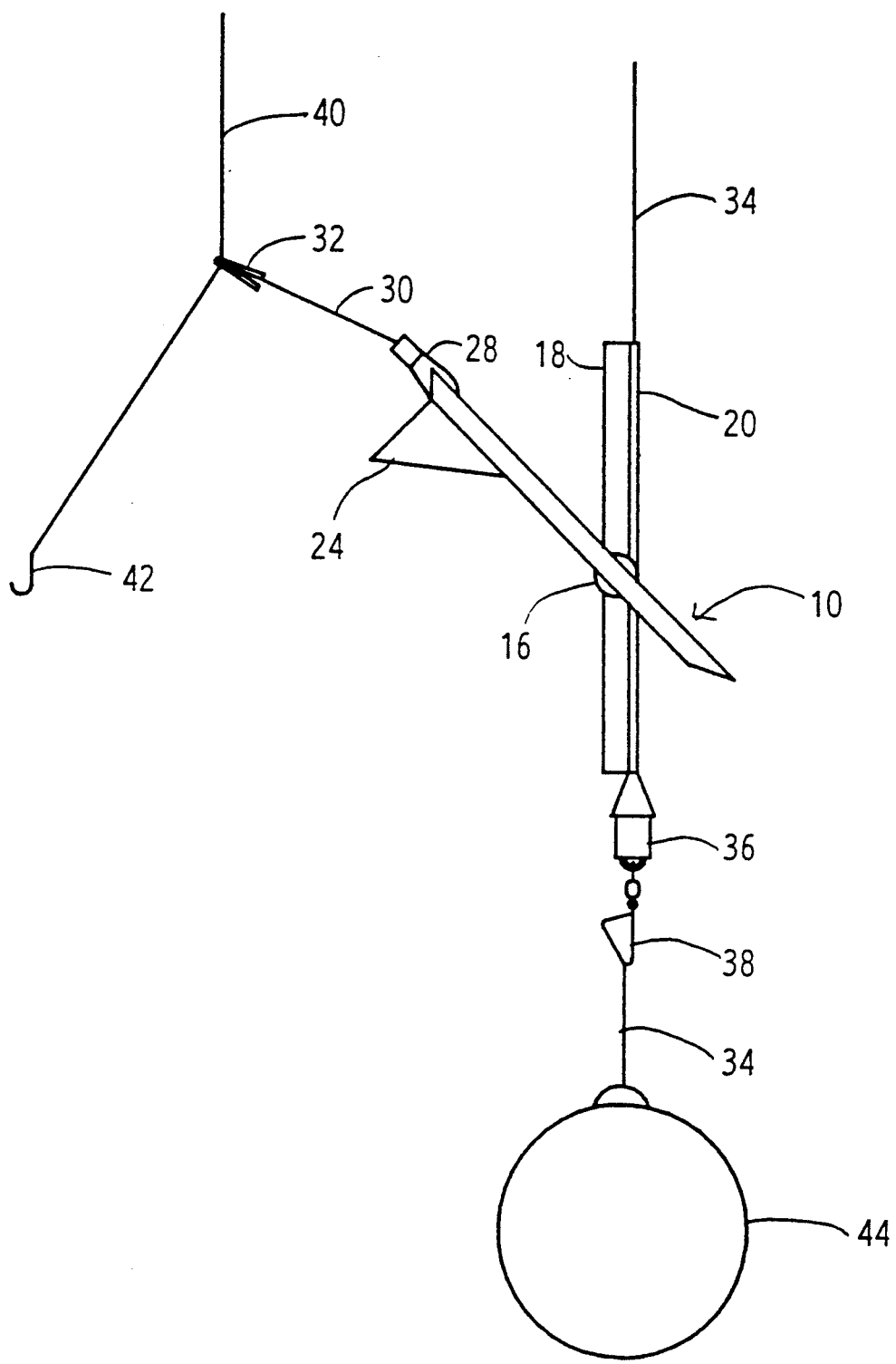
FIG. 3 shows the hydrodynamic plane in the down-planing position.
Figure 4A:
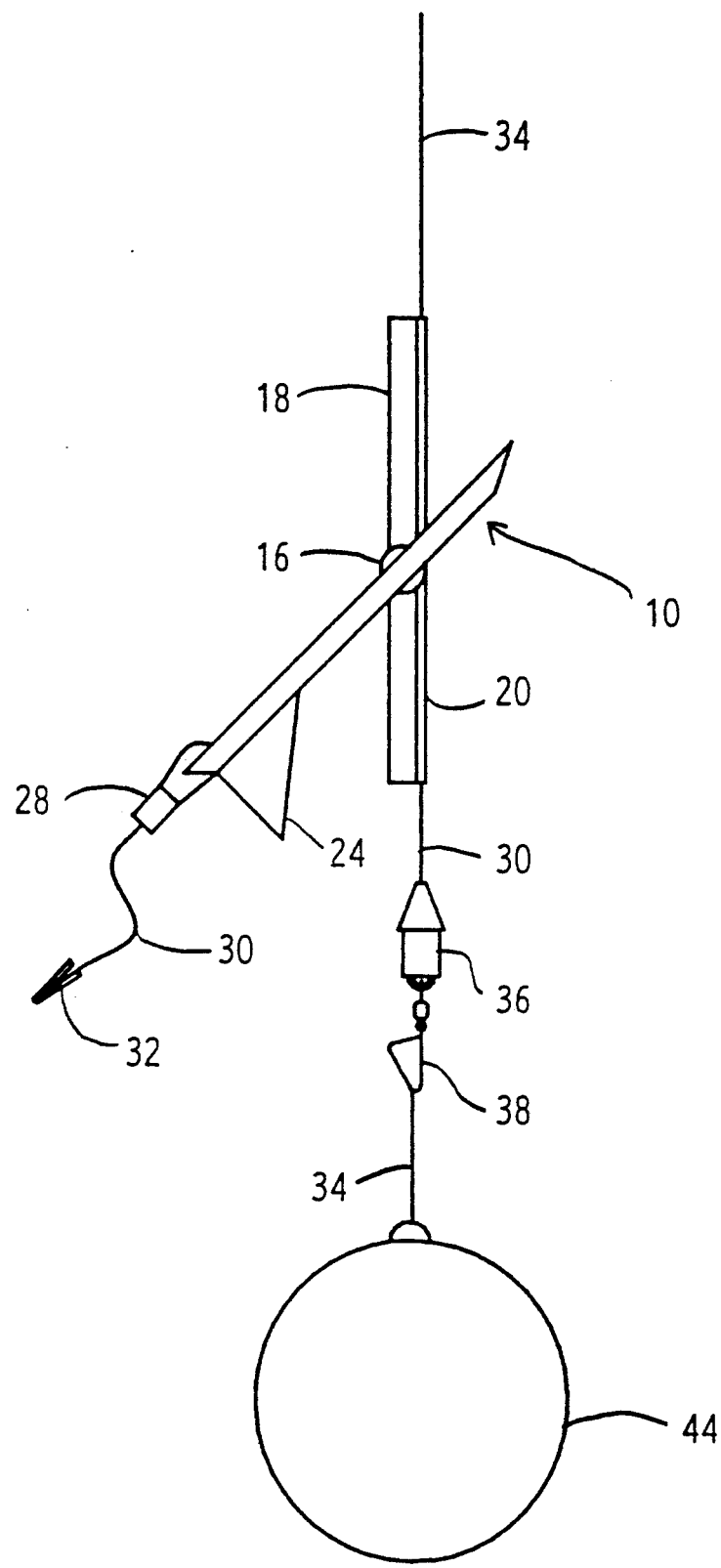
FIGS. 4A and 4B show the hydrodynamic plane in the up-planing position.
Figure 4B:
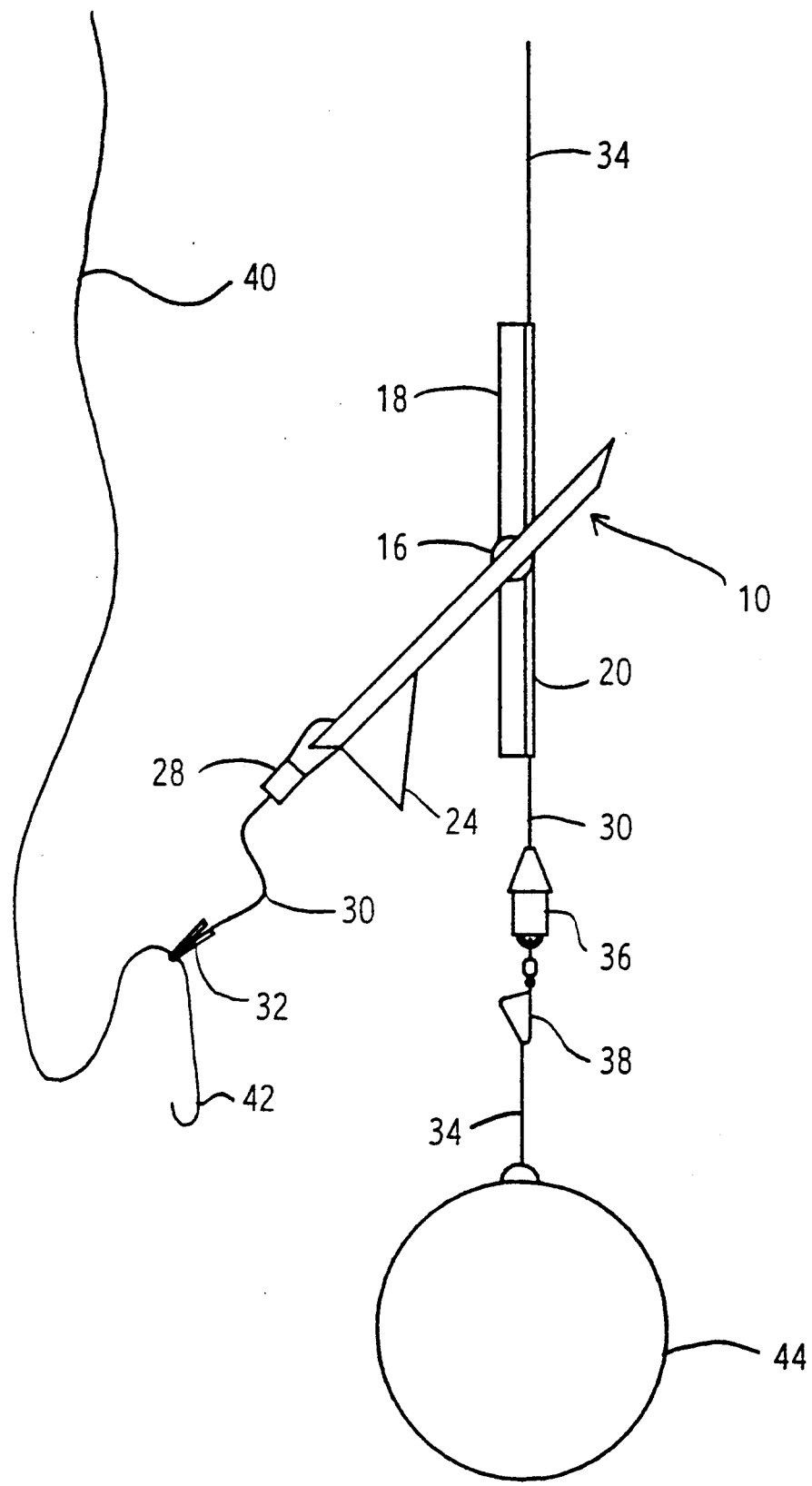

FIGS. 3, 4A and 4B show the operation of the hydrodynamic plane. To begin using the hydrodynamic plane 10, the line guide 20 is attached to the downrigger cable 34 and the downrigger weight 44 which is typically 5 to 15 pounds is attached to the end of the cable with a clip 38 and a swivel 36. The downrigger weight 44 is dropped to the desired depth in the water. The fishing line 40, which has a baited hook 42 or a lure on the end, is attached to the releasable fishing line holder 32 and the device 10 is lowered into the water. To make the hydrodynamic plane 10 begin to dive, the fisherman need only place a light tension on the fishing line 40, which moves the body 12 of the hydrodynamic plane 10 into the down-planing position, as shown in FIG. 3. The hydrodynamic force on the body 12 of the plane as it is trolled through the water causes the plane 10 to dive. The plane 10 will continue to dive as long as a light tension is kept on the fishing line 40. This is easily done by setting the drag on the fishing reel to give a slight resistance to the unreeling of the line. By trial and error, it is easy to find the right drag resistance that is enough to keep the plane in the down-planing position, but not enough to overcome the diving force.

When the plane 10 reaches the end of the downrigger cable 34, it is at the desired depth for trolling. Maintaining the slight tension on the fishing line 40 will keep the plane 10 in this position as long as desired. When a fish takes the baited hook 42 or the lure, the tension on the line 40 is enough to pull it free of the releasable fishing line holder 32. Because the pivot of the line guide 70 is located forward of the center of gravity of the body 12 of the plane, the body 12 will rotate downward into the up-planing position when there is no tension on the fishing line holder 32. Therefore, while the fisherman is occupied with landing the fish that has just taken the hook, the hydrodynamic plane 10 automatically switches to the up-planing position, as shown in FIG. 4A. The hydrodynamic force on the body 12 of the plane causes the plane 10 to rise. Once the plane 10 has reached the surface another fishing line 40 can be clipped to the fishing line holder 32 and the plane 10 can be sent back down the downrigger line 34. Thus, the invention allows the fisherman to catch many fish without the tedium of reeling in the downrigger line each time. Since the fishing line 40 releases from the hydrodynamic plane 10 when a fish is caught, the fisherman can land the fish without the added weight or the drag of the diving plane on the line.

If at any time while the hydrodynamic plane 10 is in the water, the fisherman wants it to return to the surface for any reason, such as to check the bait or untangle debris from the hooks, the plane 10 can be made to return to the surface on command. This is done by simply relaxing the tension on the fishing line 40 which allows the plane 10 to switch to the up-planing position, as shown in FIG. 4B. The plane can be signaled to return by releasing the drag on the fishing reel or by simply dipping the tip of the fishing pole to relieve the tension on the line. The plane 10 carries the fishing line 40 with it when it rises to the surface. To send the plane 10 back down after checking the bait, the fisherman can switch the plane to the down-planing position by putting a little bit of tension on the fishing line 40 by hand and allowing the line to slip through his fingers until the plane has reached the end of the downrigger cable 34.

In this way, the hydrodynamic plane can be made to dive or surface on command. This is in marked contrast to the prior art devices which do not allow this degree of control over the diving action of the plane. Most of the prior art devices only cause the plane to dive and have no mechanism for returning the plane to the surface. The one prior art device that does have a mechanism to make the plane return to the surface when a fish is hooked cannot be made to dive or surface at will. The only other way to make the device surface is to pull on the fishing line hard enough that it comes free of the fishing line holder, which allows the plane to rise. This method is counterproductive because the fisherman must reel in the fishing line and reset the diving plane in order to check the bait or the lure. The present invention allows the fisherman to check the bait or the lure as often as desired without having to reel in the fishing line or reset the diving plane.

Figure 5:
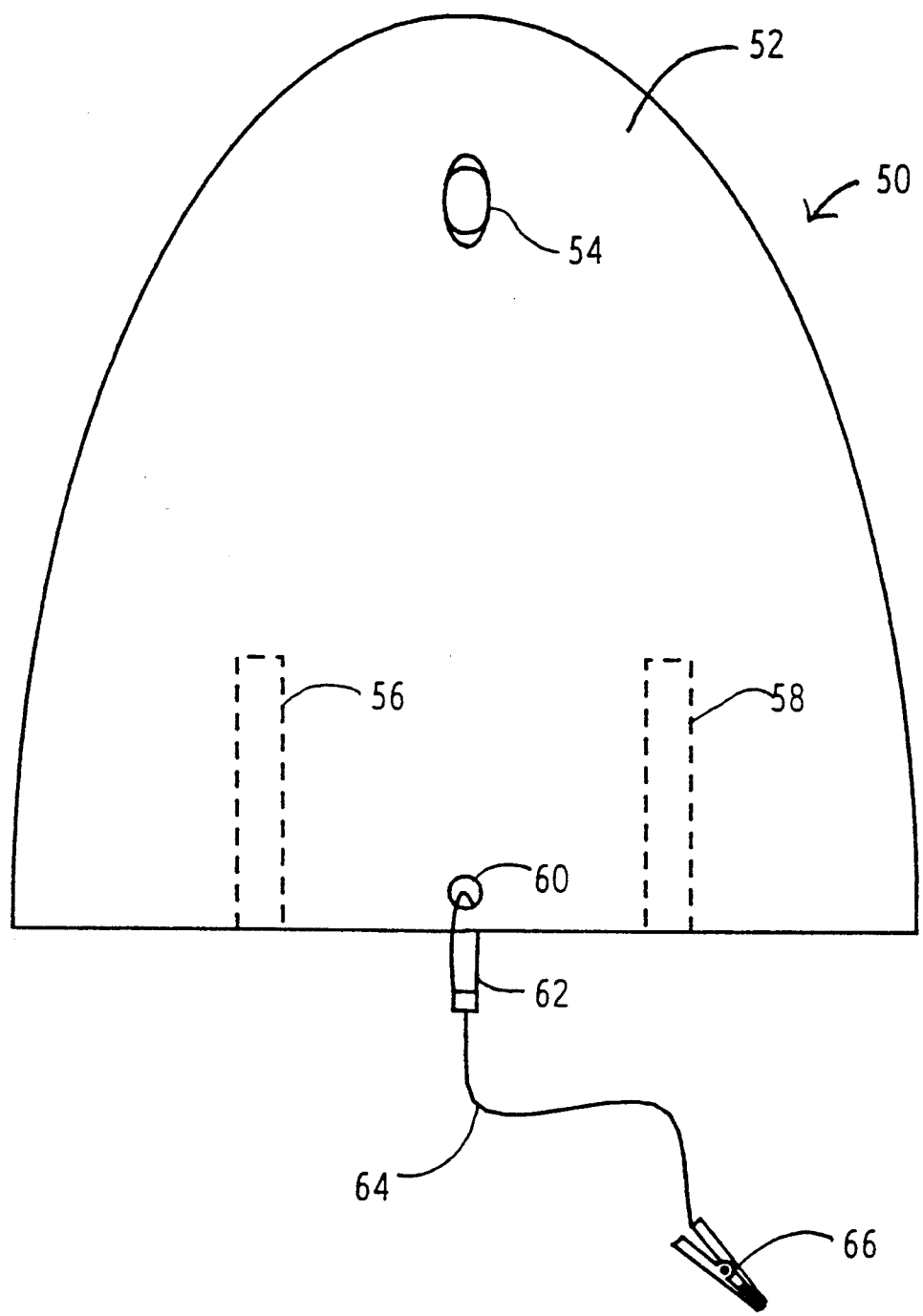
FIG. 5 shows a top view of a second embodiment of the hydrodynamic plane.
Figure 6:
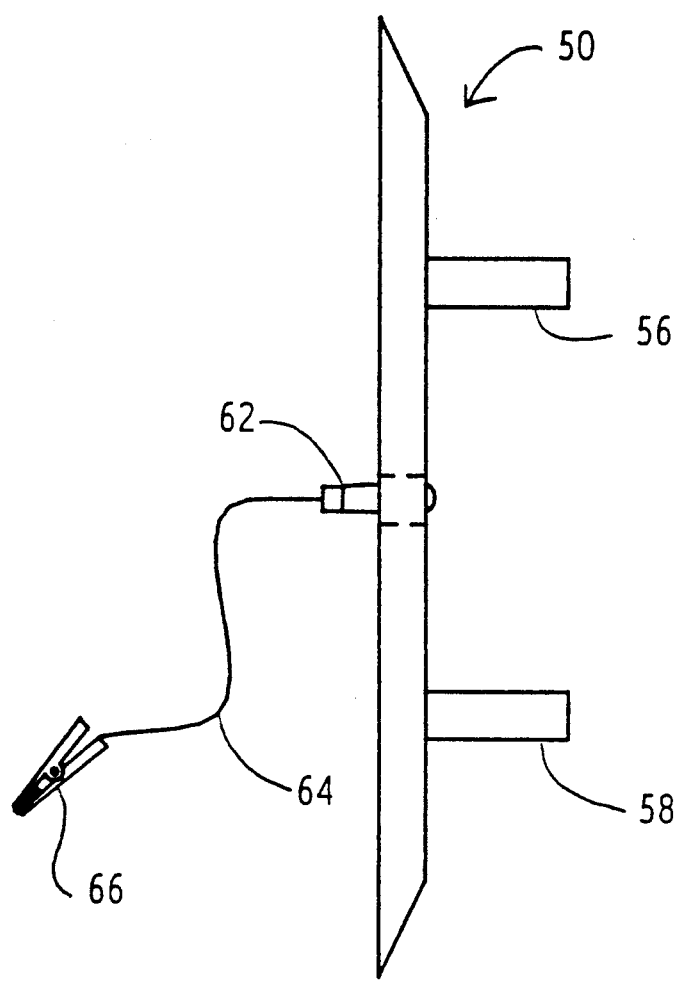
FIG. 6 shows a front view of the second embodiment.
Figure 7:
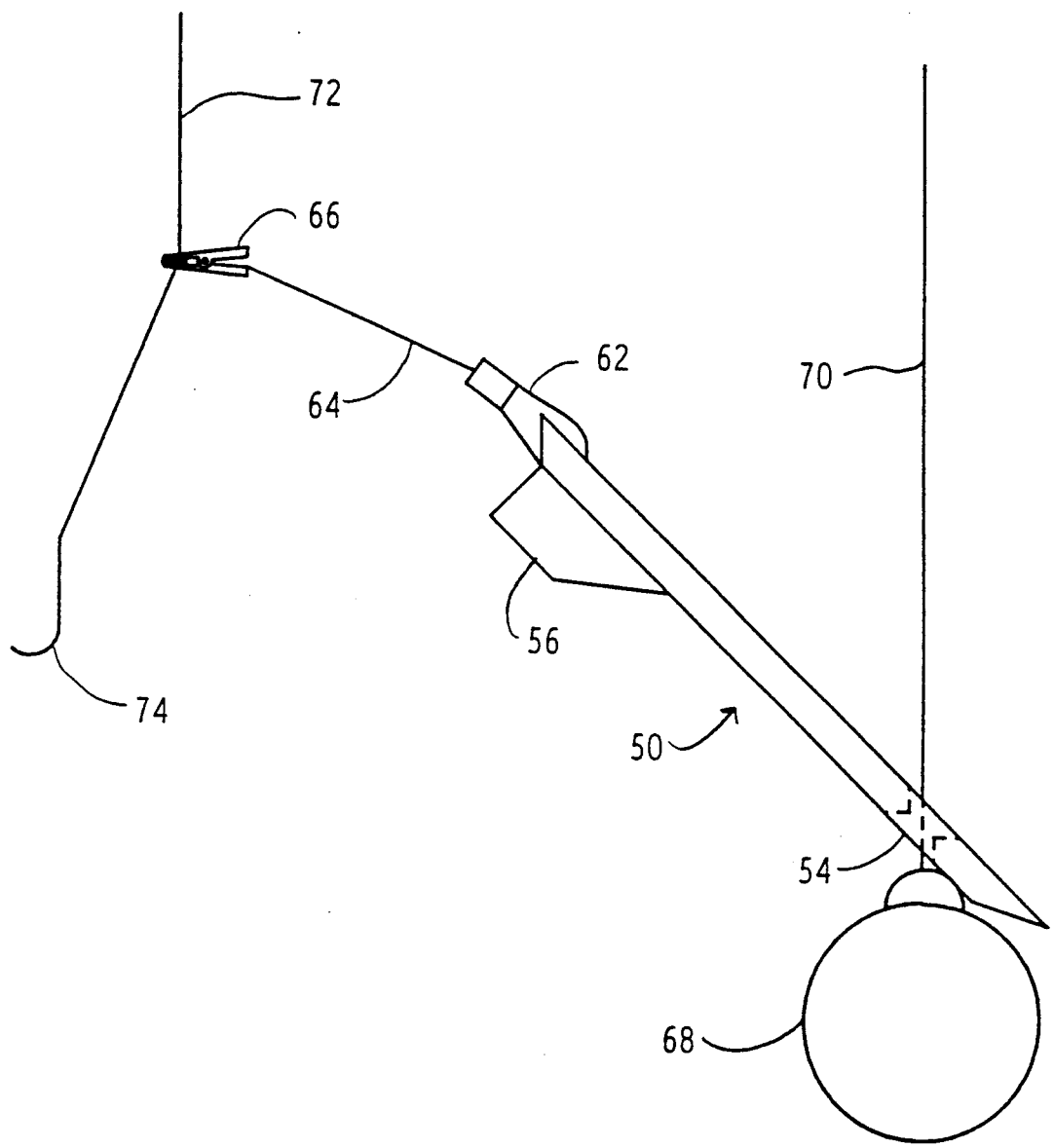
FIG. 7 shows the second embodiment in the down-planing position.
Figure 8A:
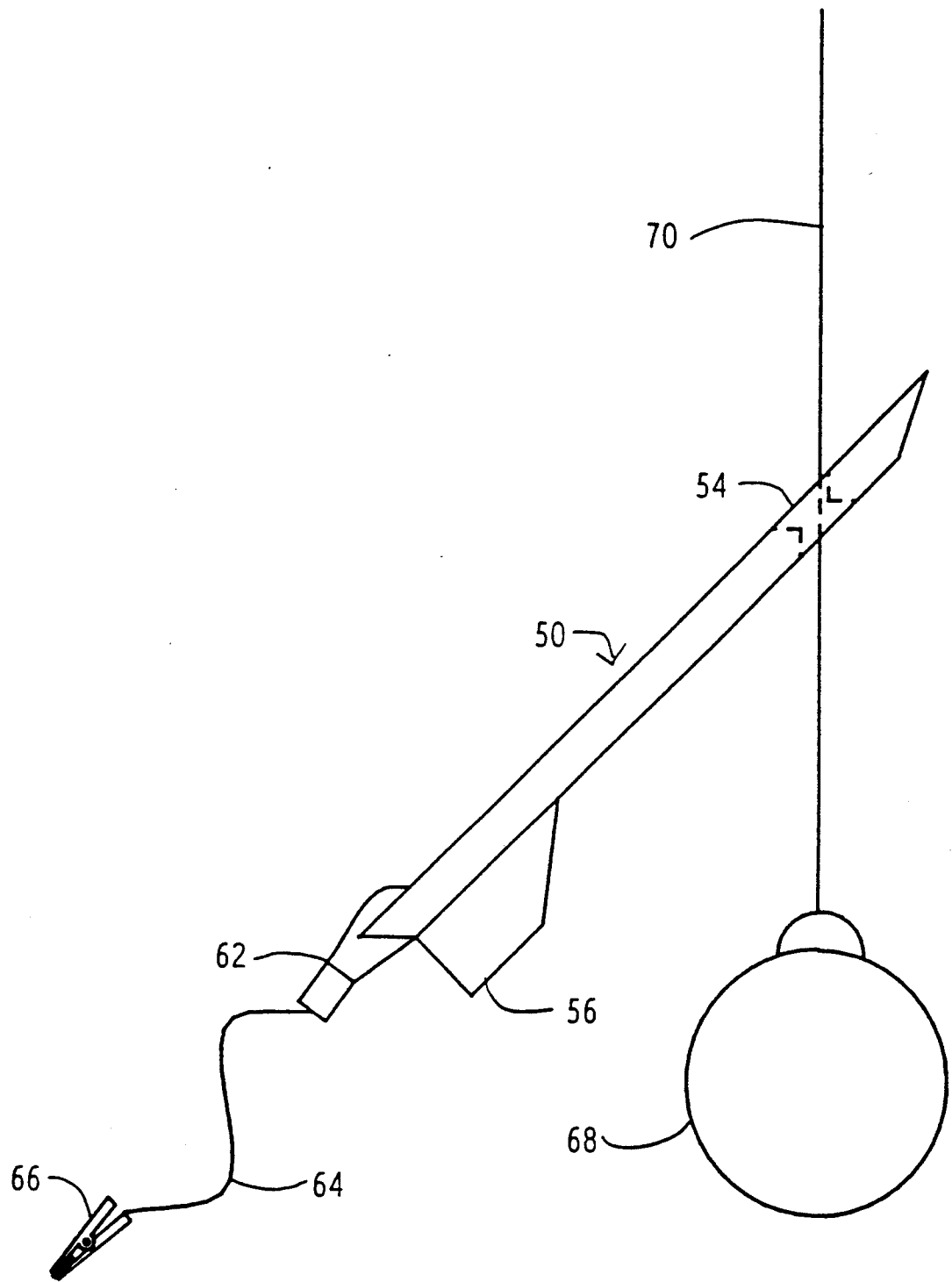
FIGS. 8A and 8B show the second embodiment in the up-planing position.
Figure 8B:
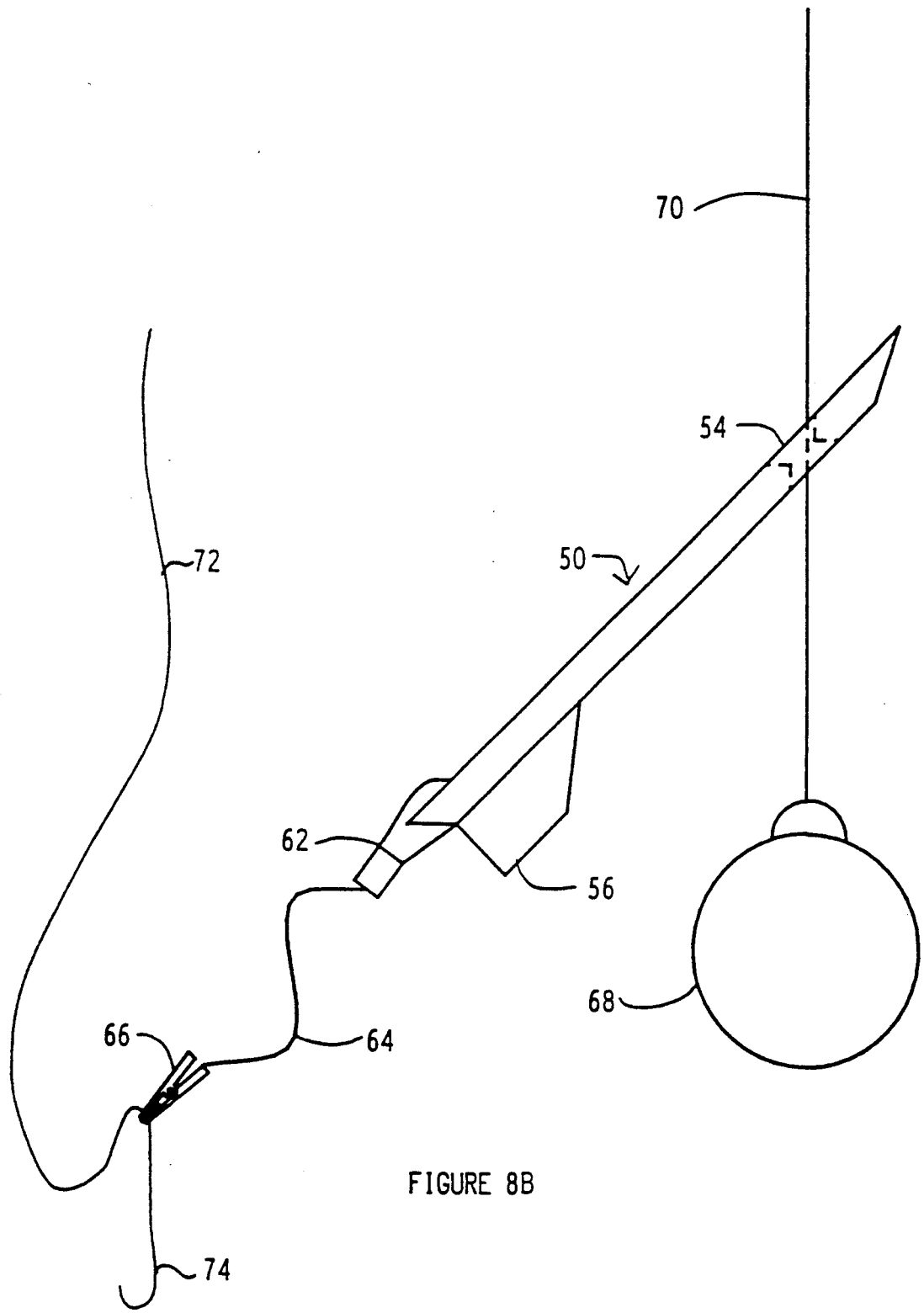

A second embodiment of the invention is shown in FIGS. 5 and 6. Like the first embodiment, this model has a streamlined body 52 and a pair of downwardly projecting fins 56, 58 for hydrodynamic stability and a releasable fishing line holder 66 attached by a leader 64 to the rear edge of the body 52. The pivoting line guide of the first embodiment has been replaced with a specially shaped guide hole 54 that serves as a line guide for moving up and down the downrigger cable. The guide hole 54 is located forward of the center of gravity of the body 52 of the plane so that the body 52 will rotate downward into the up-planing position when there is no tension on the fishing line holder 66. The guide hole 54 is made long in the longitudinal direction which allows the body 52 of the plane to pivot up and down, but it is made narrow in the transverse direction which keeps the plane 50 from tilting side to side. When viewed from the side, as in FIG. 7, the guide hole 54 has an hour glass shape that helps in its function as a line guide. The guide hole is made so that it limits the upward or downward tilt of the body of the plane without binding on the downrigger line which would hamper its up and down motion. FIG. 7 shows this embodiment of the hydrodynamic plane 50 in the down-planing position. As can be seen in this side view, the hourglass shape of the guide hole 54 limits the downward tilt of the body of the plane to the correct diving angle, but it presents smooth sliding surfaces to the downrigger cable 34 rather than the corners of a straight through-hole. This allows the plane 50 to dive without binding on the downrigger cable 34. Likewise, when the plane 50 is in the up-planing position, as shown in FIGS. 8A and 8B, the shape of the guide hole limits the upward tilt of the plane, but allows it to slide smoothly along the downrigger cable 34 without binding. Replacing the pivoting line guide of the first embodiment with this specially shaped guide hole allows for more economical manufacturing with no loss of performance in the hydrodynamic plane.

Figure 9:
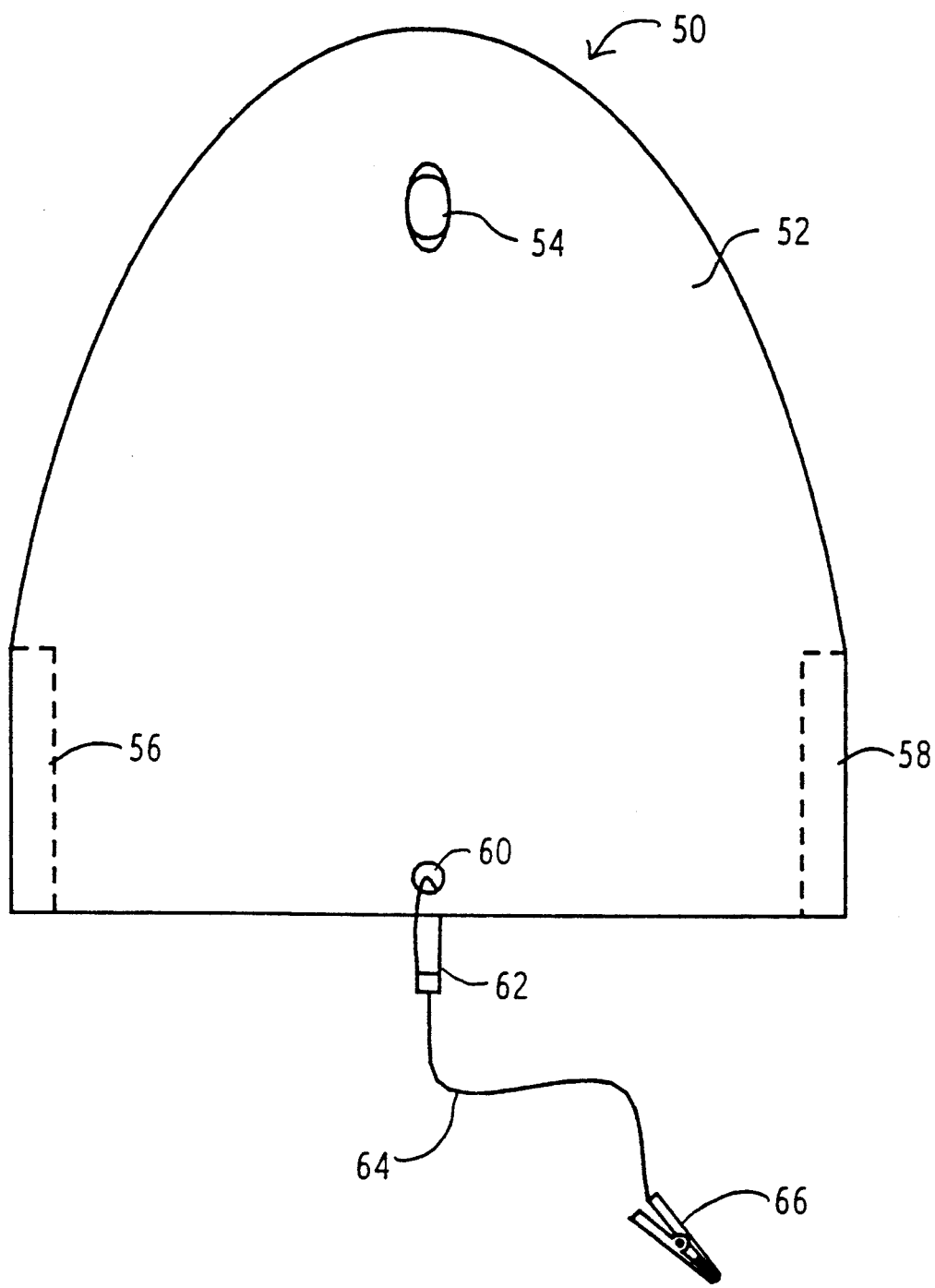
FIG. 9 shows a top view of a third embodiment of the hydrodynamic plane.
Figure 10:
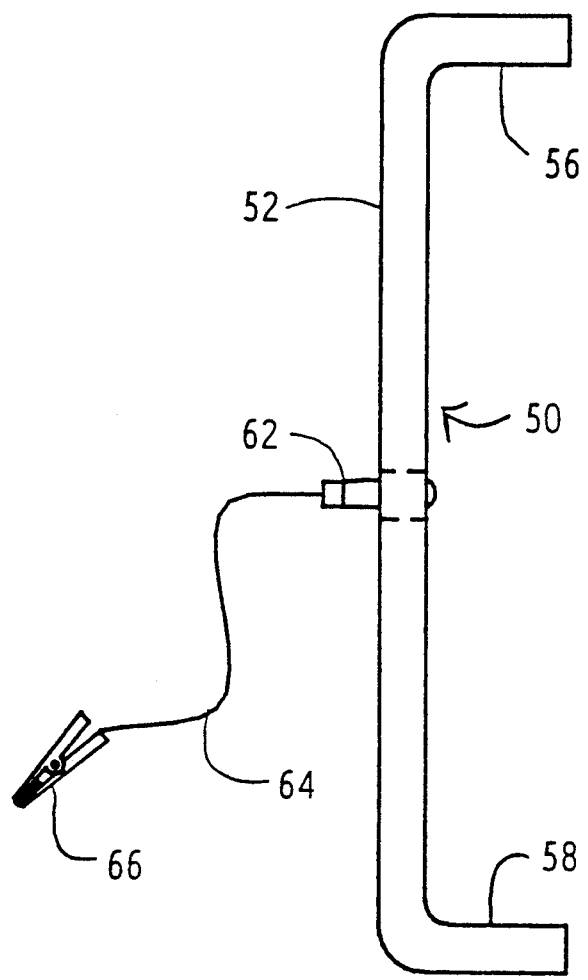
FIG. 10 shows a front view of the third embodiment.

The preferred material for manufacturing the hydrodynamic plane is plastic, such as acrylic, polystyrene or polyethylene. The different choices of materials allow the device to be made negatively buoyant, neutrally buoyant or positively buoyant. The hydrodynamic plane can be assembled from cast or extruded sheets of plastic or the body and fins of the plane can be molded as one piece. FIGS. 9 and 10 show a third embodiment of the hydrodynamic plane that is specifically designed for economical manufacturing by thermoforming or other sheet molding techniques.

Although the examples given include many specificities, they are intended as illustrative of only some of the possible embodiments of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

I claim:

1. A device for transporting a fishing line up and down
    a weighted line which is moving through the water, said device comprising:
    a hydrodynamic plane having a leading edge and a trailing edge,
    a means for pivotally and slidably attaching said hydrodynamic plane to said weighted line,
    and a means for releasably attaching said fishing line to said hydrodynamic plane proximate said trailing edge,
    said device having at least three operative states:
    a) a first operative state in which said fishing line is attached to said hydrodynamic plane by said means for releasably attaching said fishing line and in which an upward tension on said fishing line, not exceeding a predetermined threshold tension, holds said hydrodynamic plane in a down-planing position, thereby causing a downward force as said device is moved through the water,
    b) a second operative state in which said fishing line is attached to said hydrodynamic plane by said means for releasably attaching said fishing line and in which the absence of an upward tension on said fishing line, causes said hydrodynamic plane to assume an up-planing position, thereby causing an upward force as said device is moved through the water,
    c) a third operative state in which a tension on said fishing line which exceeds said predetermined threshold tension causes said means for releasably attaching said fishing line to release said fishing line, causing said hydrodynamic plane to assume an up-planing position, thereby causing an upward force as said device is moved through the water.

2. The device of claim 1, wherein said means for releasably attaching said fishing line to said hydrodynamic plane comprises a friction clamp which will release said fishing line when the tension on said fishing line exceeds said predetermined threshold level, thereby allowing said hydrodynamic plane to assume an up-planing position.

3. The device of claim 1, wherein said means for pivotally and slidably attaching said hydrodynamic plane to said weighted line is positioned forward of the center of gravity of said hydrodynamic plane so that said hydrodynamic plane will automatically assume an up-planing position in the absence of an upward tension on said fishing line.

4. The device of claim 1, further comprising at least one fin attached to said hydrodynamic plane proximate said trailing edge such that the hydrodynamic force on said fin caused by the motion of said device through the water will keep said device oriented with said leading edge facing the direction of motion.

5. The device of claim 1, wherein said means for pivotally and slidably attaching said hydrodynamic plane to said weighted line comprises a tubular line guide which is pivotally attached to said hydrodynamic plane.

6. The device of claim 1, wherein said means for pivotally and slidably attaching said hydrodynamic plane to said weighted line comprises a guide hole in said hydrodynamic plane through which said weighted line passes.

7. The device of claim 6, wherein said guide hole is wider in the longitudinal direction than in the transverse direction such that said guide hole allows said hydrodynamic plane to pivot from the down-planing position to the up-planing position in the longitudinal direction and prevents said hydrodynamic plane from pivoting side to side in the transverse direction.

8. The device of claim 7, wherein the longitudinal cross section of said guide hole is an hourglass shape so that the shape of said guide hole limits the degree of pivot of said hydrodynamic plane, while presenting a smooth sliding surface to said weighted line, when said hydrodynamic plane is in the down-planing position and in the up-planing position.

9. A device for transporting a fishing line up and down a weighted line which is moving through the water, said device comprising:

a hydrodynamic plane having a leading edge and a trailing edge, at least one fin attached to said hydrodynamic plane proximate said trailing edge such that the hydrodynamic force on said fin caused by the motion of said device through the water will keep said device oriented with said leading edge facing the direction of motion, an attachment means for pivotally and slidably attaching said hydrodynamic plane to said weighted line, said attachment means being positioned forward of the center of gravity of said hydrodynamic plane, and a friction clamp for releasably attaching said fishing line to said hydrodynamic plane proximate said trailing edge, said device having at least three operative states:

a) a first operative state in which said fishing line is attached to said hydrodynamic plane by said friction clamp and in which an upward tension on said fishing line, not exceeding a predetermined threshold tension, holds said hydrodynamic plane in a down-planing position, thereby causing a downward force as said device is moved through the water, b) a second operative state in which said fishing line is attached to said hydrodynamic plane by said friction clamp and in which the absence of an upward tension on said fishing line, causes said hydrodynamic plane to assume an up-planing position, thereby causing an upward force as said device is moved through the water, c) a third operative state in which a tension on said fishing line which exceeds said predetermined threshold tension causes said means for releasably attaching said fishing line to release said fishing line, causing said hydrodynamic plane to assume an up-planing position, thereby causing an upward force as said device is moved through the water.

10. A device for transporting a fishing line up and down a weighted line which is moving through the water, said device comprising:

a hydrodynamic plane having a leading edge and a trailing edge, a guide hole in said hydrodynamic plane through which said weighted line passes for pivotally and slidably attaching said hydrodynamic plane to said weighted line, and a means for releasably attaching said fishing line to said hydrodynamic plane proximate said trailing edge such that an upward tension on said fishing line will hold said hydrodynamic plane in a down-planing position, causing a downward force as said device is moved through the water, and such that in the absence of an upward tension on said fishing line, said hydrodynamic plane will assume an up-planing position, causing an upward force as said device is moved through the water, said guide hole being wider in the longitudinal direction than in the transverse direction such that said guide hole allows said hydrodynamic plane to pivot from the down-planing position to the up-planing position in the longitudinal direction and prevents said hydrodynamic plane from pivoting side to side in the transverse direction, and said guide hole being an hourglass shape so that the shape of said guide hole limits the degree of pivot of said hydrodynamic plane, while presenting a smooth sliding surface to said weighted line, when said hydrodynamic plane is in the down-planing position and in the up-planing position.

* * * * *